350-453 SR
XR 3,497,701
Feb. 24, 1970 J. J. DALTON 3,497,701
LIGHT PEN OPTICAL SYSTEM FOR DISPLAY APPARATUS
Filed July 14, 1967
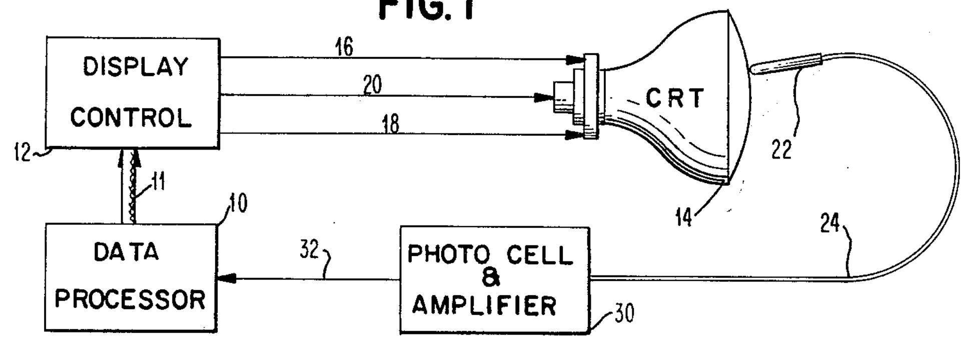
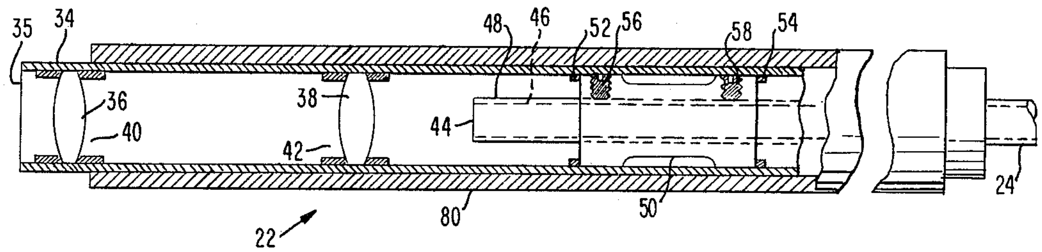
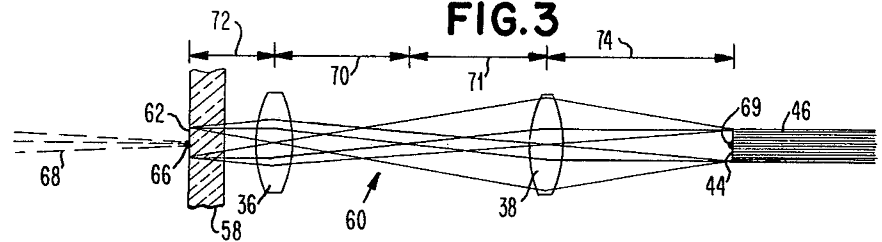
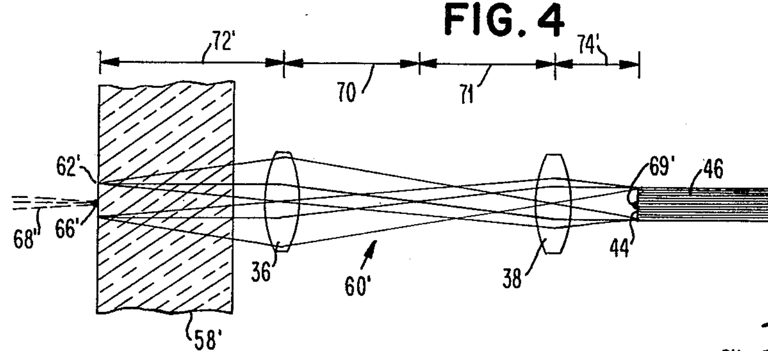
INVENTOR
JOHN J. DALTON
BY Fredrick D. Poag
ATTORNEY
497701

United States Patent Office 3,497,701

Patented Feb. 24, 1970

1

3,497,701

LIGHT PEN OPTICAL SYSTEM FOR DISPLAY APPARATUS

John J. Dalton, Rhinebeck, N.Y., assignor to International Business Machines Corporation, Armonk, N.Y., a corporation of New York Filed July 14, 1967, Ser. No. 653,395
Int. Cl. H01j 39/12, 3/14, 5/16
U.S. Cl. 250—216 6 Claims

ABSTRACT OF THE DISCLOSURE

A manipulatable light receptor (so-called "light pen" or "light gun") for a cathode ray tube (CRT) display is disclosed, which receptor includes a modified telecentric, unity magnification lens system. A fiber optic light receiver is adjustable with respect to the lens system to accommodate changes in the distance between the CRT light source image to be detected and the lens system, without change in size of the field of detection at the CRT.

BACKGROUND OF THE INVENTION

This invention relates to apparatus for detecting the presence of light in a field of reference, and more particularly to an improved display indicia sensing apparatus for incorporation in a cathode ray tube display or the like.

Displays employing "light guns" or "light pens" have been in considerable use for more than a decade. The apparatus disclosed in U.S. Patent No. 2,915,643 is one example of such prior art devices. These devices are called light guns or pens because of their shape and of their functional use in causing something to happen to the display, but they are actually manipulatable light receptors and usually function only indirectly, through data processing apparatus associated with the display, to take any action with respect to the display or the data represented thereon.

Such a receptor, in order to perform its intended function of detecting the presence of a discrete item of display, as opposed to neighboring items, must include a means for defining its field of sensitivity on the display screen or the like. Prior art devices, such as that shown in the aforesaid U.S. Patent No. 2,915,643, have utilized a lens system for that purpose. While a single lens arrangement such as shown in that patent serves to define an operative field at the display screen, the size of the field varies with the distance between the lens and the screen unless the positions of both the lens and the light receptor are adjusted to refocus the system at the desired magnification.

This lens to screen distance differs with the design of the particular display apparatus. For example, some CRT's have a thick face plate while in others it is thin; moreover, implosion shields and other features of design may dictate different distances between the operating point of the lens system and the display screen in various equipments. These differences may exceed those which can be accommodated by a practicable adjustment in a single lens system. The result is that, utilizing prior art single lens techniques, each display model would require a light pen or the like specifically designed for the particular equipment. This leads to undesirably low volume, and therefore high cost, of manufacturing, stocking and supplying this part. Moreover, there is usually some difference in the dimensions from system to system of even the same model display, and the prior art single lens systems require the aforesaid two adjustments to compensate for this.

2

SUMMARY OF THE INVENTION

The present invention provides a display system light pen characterized by constant magnification of the optical field despite variations in the position of the lens system between the light receptor and the display surfaces with which it cooperates. Thus, the only adjustment necessary to focus the lens system is in the position of the receptor in the light pen or other suppoting structure.

To provide this characteristic, two positive lenses are arranged in back-to-back configuration and spaced apart by the sum of their focal lengths, with the lenses disposed in an optical path between the display and receptor surfaces. Then, with the receptor surface adjusted to be disposed twice that sum of focal lengths from the display surface, the working field at the display surface will be focused at the receptor surface. Since the lens system is free to be located as close as is mechanically practicable to the display screen, the system is characterized by a high light gathering efficiency. At the same time, the system possesses adjustability whereby the lens system can focus with a lens-to-screen distance of up to nearly the sum of the focal lengths of the lenses, so as to be adaptable to use with displays having thick face plates and/or implosion shields or the like.

Preferably, the central iris found in true telecentric lens systems is omitted in the two-lens system of the invention, since the provision of ease of focusing as aforedescribed makes the restriction to parallel light of such systems unnecessary. By using focused instead of merely parallel light, the preferred system of the present invention gathers more useful light, for a higher signal to noise ratio.

Accordingly, it is a primary object of the invention to provide a display system light pen apparatus having improved accuracy and adaptability in operation.

It is another object of the invention to provide, in a light pen apparatus as aforedescribed, an improved lens system characterized by accurate definition of the operating field of the pen, and ready adaptability to use in environments having varying pen-to-screen operating distances. Another object of the invention is to provide, in a light pen as aforedescribed, a lens system characterized by ease of focusing over a wide variation in lens to screen distances, without change in magnification.

BRIEF DESCRIPTION OF THE DRAWING

FIG. 1 is a schematic of a display system embodying improved detector apparatus in accordance with the invention.

FIG. 2 is a partially sectioned, fragmentary view of the light pen of the apparatus of FIG. 1.

FIG. 3 is a light ray diagram showing the operation of the optics of the light pen of FIG. 2, adjusted to focus on the screen of a cathode ray tube having a thin face plate.

FIG. 4 shows the same optic system adjusted to focus on the screen of a cathode ray tube having a thick face plate.

DESCRIPTION OF THE PREFERRED EMBODIMENT

In display systems which utilize a cathode ray tube or similar transient display apparatus, it is frequently desirable to have a manipulatable light detector which can identify an element of the display in terms of the time of its illumination. One example of such a system is illustrated schematically in FIG. 1, and includes a data processing apparatus 10 connected via cable 11 to a display generator or control 12 for operating a cathode ray tube (CRT) 14 in such manner as to make the latter an output device for certain data which has been processed in the system. For example, the data output of the processor 10 may include a digital address of a location on the screen of the CRT 14, and the control 12 may include digital-to-analog converter and timing circuitry for directing the electron beam of the CRT to that address and unblanking or intensifying the beam in concert with such direction or deflection, all as is well known in the art. These horizontal and vertical deflection, and intensification control functions are indicated in the drawing at 16, 18 and 20 respectively. Frequently it is desired that a means be provided whereby some action can be taken with respect to an element of the data. For example, in some prior art systems it is desirable that the digital equivalent of the data be read out from the processor upon its identification by the light sensor; in other prior art devices the identification of the data becomes an instrument of control whereby some programming action, separately identified by a keyboard or the like (not shown) may be taken with respect to the light sensor identified data. In either case, a manipulatable detector 22 is provided to receive the burst of light from the CRT which burst is time coincident with the data to be identified. The detector thereby provides a signal which, in electrical form, can gate or otherwise control circuits in the processor 10 to achieve one of the above described results. The circuits of the processor and the display control are not, per se, part of the present invention. A detailed description of one prior art system of the kind alluded to is set forth in U.S. Patent No. 3,037,192, for example.

In the present illustrated system the manipulatable device or light pen 22 contains a lens system for gathering the light, and a fiber optic light path 24 is provided for conveying the light to a suitable detector or transducer such as a photo cell and amplifier apparatus 30. The fiber optic link enables removal of the photo cell and amplifier apparatus from the pen so as to enable its mounting at a more convenient and easily shielded place in the display apparatus. The output of this light transducing apparatus 30 is connected as shown at 32 to the data processor so as to identify, in terms of time, the element of data in the processor which through the display control had caused the burst of light detected.

A preferred form of the light pen of the invention, somewhat simplified for clarity of illustration, is shown in FIG. 2. The pen comprises a barrel 34 having a nose orifice 35 providing for light entry to a lens system comprising two positive lenses 36 and 38 which are mounted by retainer rings 40, 42 or the like within the barrel 34, at a spacing equal to the sum of the focal lengths of the lenses. In the illustrated preferred embodiment of the invention the lenses are the same focal length "$f$" and the distance between the lenses is $2f$.

The aforedescribed lens system is designed to focus the light, received from the display through the aperture 35, on the receiver end 44 of a fiber optic bundle 46 forming the light path within the fiber optic link or cable 24. The portion of the fiber optic bundle lying within the pen is sheathed in a rigid sleeve 48 by which it is mounted in a boat or spider 50 fixedly positioned by retainer rings 52, 54 in the barrel 34. For a reason which will become apparent in connection with the discussions of FIGS. 3 and 4 below, the fiber optic carrying sleeve 48 is adjustable axially in the boat or spider 50 to a desired focus position, at which it may be fixed by operation of set screws 56, 58.

FIG. 3 illustrates a focused adjustment of the optical system of FIG. 2, in use with a CRT having a thin face plate 58. The focused ray system 60 projects the operating field 62, at the screen of the CRT, on the receiver end 44 of the fiber optics bundle 46, so as to image a point of light 66, formed in the operating field 62 by the electron beam 68 of the CRT, at 69 on the receiver 44. Since a unity magnification system is illustrated, the focal lengths 70 and 71 of lenses 36 and 38 are equal and the sum of the target and images distances 72 and 74 equals the sum of the focal lengths 70 and 71.

FIG. 4 shows the system refocused for use with a CRT having a thick face plate 58'. Since the operating field 62' and the burst of light 66' therein to be detected are now, by reason of the thickness of the plate 58', further from the lens 36, this greater distance 72' is compensated by a reduction in the distance 74' between the other lens 38 and the focused image plane at the receiver end 44 of the bundle 46. All that had to be done to make this adjustment was to change the position of the bundle 46 (by use of the set screws 56, 58, FIG. 2) by an amount equal to the increase in the target-to-lens distance 72' at the other end of the system, so that once again the sum of distances 72' and 74' equals the sum of the focal lengths 70 and 71. Where 70 equals "$f$" and 71 also equals "$f$," the overall light path from 66 to 69 or 66'' to 69'' equals $4f$ in each case.

It will be understood that the spacing of the lens 36 from the face of the CRT face plate (or the implosion screen thereon if there is one) is fixed by the length of the nose portion of barrel 34 at the entrance opening 35 thereof. The grip 80 on some light pens is reciprocable for operating an enabling switch (not shown) of the system, but such motion has no effect on the position of the lenses.

If lenses of different focal lengths are used, the magnification will be other than unity and the relationship that the object or target to image distance is twice the sum of the focal lengths will hold for only one lens-to-object distance. However, the general principle that the system can be focused by motion of the fiber bundle alone will hold within the limits of the lenses.

If an iris is introduced at the focal points of the lenses (midway between lenses 36 and 38 in the illustrated unity magnification system), the system becomes telecentric parallel light in to parallel light out) and will accommodate changes in object or target distances automatically. However, the iris would intercept most of the light and therefore the focused system illustrated by the rays 60 or 60', etc., is preferred.

Thus, while the invention has been particularly shown and described with references to a preferred embodiment thereof, it will be understood by those skilled in the art that the foregoing and other changes in form and details may be made therein without departing from the spirit and scope of the invention.

It will be appreciated that the light path established by the lens system of the invention is bidirectional, that is, if some or all of the light fibers are exposed to outgoing radiation for pen aiming purposes, for example in the general manner taught in the optical system of said U.S. Patent 2,915,643, such outgoing radiation will be focused on the CRT screen.

As the terms are used in this application, "focal length" means equivalent focal length for infinite object distance, and "lens" includes single or multiple element refracting or reflecting structures having a first order single lens equivalent.

What is claimed is:

1. In a display system, apparatus for detecting radiant energy emanating from a display medium, comprising
   - a manipulatable receptor comprising an entrance structure, an energy receiver, and a lens system in an optical path therebetween, wherein the improvement comprises,
   - said lens system comprising two positive lenses, the principal planes of which are spaced apart a distance equal to the sum of their focal lengths,
   - said receptor including mounting means locating said energy receiver for receipt of energy gathered from said medium by said lens system over a range of medium-to-lens distances.

2. The combination of claim 1, wherein
   - said mounting means is adjustable to permit positioning of said receiver longitudinally of said light path to receive focused light from an object located in said light path beyond said entrance structure.

3. The combination of claim 2 wherein said display system comprises a cathode ray tube having a face structure and a screen on the inner surface thereof, said object is a burst of light on the screen of said tube, and said entrance structure is adapted to bear against the outer surface of said face structure.

4. The combination of claim 3, wherein said light path is substantially open between said lenses, for transmitting parallel and angular light originating at said object.

5. The combination of claim 4, wherein the lenses of said lens system are of equal focal lengths.

6. The combination of claim 5, wherein the position of said receiver is adjustable to provide the light path from said object to said receiver with a length of four times said focal length.

References Cited

UNITED STATES PATENTS

| | | | |
|---|---|---|---|
| 3,247,391 | 4/1966 | Ogle et al. | 250—217 X |
| 3,334,236 | 8/1967 | Bacon | 250—227 X |
| 3,362,074 | 1/1968 | Luebkeman et al. | 350—212 |

RALPH G. NILSON, Primary Examiner

T. N. GRIGSBY, Assistant Examiner

U.S. Cl. X.R.

250—217, 227; 350—96, 212